US011797410B2

(12) United States Patent
Ganapathy et al.

(10) Patent No.: US 11,797,410 B2
(45) Date of Patent: Oct. 24, 2023

(54) CHIPLET-LEVEL PERFORMANCE INFORMATION FOR CONFIGURING CHIPLETS IN A PROCESSOR

(71) Applicant: Advanced Micro Devices, Inc., Santa Clara, CA (US)

(72) Inventors: Shrikanth Ganapathy, Mountain View, CA (US); Yasuko Eckert, Redmond, WA (US); Anthony Gutierrez, Seattle, WA (US); Karthik Ramu Sangaiah, Seattle, WA (US); Vedula Venkata Srikant Bharadwaj, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 159 days.

(21) Appl. No.: 17/526,218

(22) Filed: Nov. 15, 2021

(65) Prior Publication Data

US 2023/0153218 A1     May 18, 2023

(51) Int. Cl.
*G06F 15/80*     (2006.01)
*G06F 11/30*     (2006.01)
*G06F 11/34*     (2006.01)

(52) U.S. Cl.
CPC ...... *G06F 11/3051* (2013.01); *G06F 11/3024* (2013.01); *G06F 15/80* (2013.01); *G06F 11/3409* (2013.01); *Y02D 10/00* (2018.01)

(58) Field of Classification Search
CPC .. G06F 11/3051; G06F 11/3024; G06F 15/80; G06F 11/3409; Y02D 10/00
See application file for complete search history.

(56) References Cited

U.S. PATENT DOCUMENTS

| | | | |
|---|---|---|---|
| 2010/0064162 A1* | 3/2010 | Rotem | G06F 1/206 |
| | | | 713/340 |
| 2011/0022833 A1* | 1/2011 | Nussbaum | G06F 1/324 |
| | | | 712/30 |

(Continued)

OTHER PUBLICATIONS

Papadimitriou et al.; Adaptive Voltage/Frequency Scaling and Core Allocation for Balanced Energy and Performance on Multicore CPUs; 2019 (Year: 2019).*

(Continued)

*Primary Examiner* — Corey S Faherty
(74) *Attorney, Agent, or Firm* — Park, Vaughan, Fleming & Dowler LLP

(57) ABSTRACT

A processor includes a controller and plurality of chiplets, each chiplet including a plurality of processor cores. The controller provides chiplet-level performance information for the chiplets that identifies a performance of each chiplet at each of a plurality of performance levels for specified sets of processor cores on that chiplet. The controller receives an identification of one or more selected chiplets from among the plurality of chiplets for which a specified number of processor cores are to be configured at a given performance level, the one or more selected chiplets having been selected based on the chiplet-level performance information and performance requirements. The controller configures the specified number of processor cores of the one or more selected chiplets at the given performance level. A task is then run on the specified number of processor cores of the one or more selected chiplets at the given performance level.

24 Claims, 4 Drawing Sheets

(56) References Cited

U.S. PATENT DOCUMENTS

| | | | |
|---|---|---|---|
| 2011/0161979 A1* | 6/2011 | Flemming | G06F 9/5077 |
| | | | 718/105 |
| 2012/0233477 A1* | 9/2012 | Wu | G06F 11/3466 |
| | | | 712/E9.035 |
| 2016/0239065 A1* | 8/2016 | Lee | G06F 1/3296 |
| 2019/0253490 A1* | 8/2019 | Du | H04L 67/1008 |
| 2021/0089423 A1* | 3/2021 | Wu | G06F 9/5094 |
| 2022/0121492 A1* | 4/2022 | Cieslak | G06F 9/505 |
| 2023/0067109 A1* | 3/2023 | Hinch | G06F 11/3495 |

OTHER PUBLICATIONS

Nour et al.; A Hybrid Model for Reliability Aware and Energy-Efficiency in Multicore Systems; Jul. 2021 (Year: 2021).*

* cited by examiner

| LOOKUP TABLE 400 | SUB-TABLE 402 | SUB-TABLE 404 | | |
|---|---|---|---|---|
| | LOWEST PERFORMANCE | LOWEST NON-LINEAR PERFORMANCE | NOMINAL PERFORMANCE | HIGHEST PERFORMANCE |
| TWO CORES | 0.95 | 0.95 | 0.93 | 0.92 |
| THREE CORES | 0.93 | 0.92 | 0.87 | 0.85 |
| FOUR CORES | 0.90 | 0.88 | 0.83 | 0.80 |

CHIPLET-LEVEL PERFORMANCE INFORMATION FOR CONFIGURING CHIPLETS IN A PROCESSOR

BACKGROUND

Related Art

Some electronic devices include processors that run tasks for performing various operations, such as executing program code for an application or performing control or configuration operations. In some cases, the processors include a number of processor cores (e.g., central processing unit cores, graphics processing unit cores, etc.), each processor core being usable for running tasks or portions thereof. For example, some processors are manufactured with multiple processor cores fabricated on a single semiconductor die, or "chiplet," which is then enclosed/included in a package (e.g., a pin grid array (PGA) package, etc.). As another example, some processors are manufactured with two or more chiplets, with each chiplet having multiple processor cores fabricated thereon and the chiplets being enclosed/included within the same package. For instance, a sixteen core processor can be manufactured with two chiplets having eight processor cores each, a sixty four core processor can be manufactured with eight chiplets having eight processor cores each, etc.

Many electronic devices and the processors therein operate under various operating constraints, such as performance, electrical power consumption, and/or thermal operating constraints. For example, a processor in an electronic device may be required to operate at specified performance levels (e.g., controlling clock frequency and voltage pairs, throughput levels, portions of the chip that are powered on/off, etc.) while remaining below a thermal threshold. In some electronic devices, the Advanced Configuration and Power Interface (ACPI) standard is used for enabling operating systems (and other entities) to manage the electrical power consumed by processors while meeting other operating constraints. Under the ACPI standard, the operating system (or other entities) can place processor cores (and other functional blocks) in specified power states, receive performance monitoring information for processor cores, etc. One aspect of the ACPI standard is Collaborative Processor Performance Control (CPPC), which is a mechanism by which an operating system (or another entity) manages electrical power consumption for individual processor cores by setting operating parameters such as voltages and frequencies for the individual processor cores. For CPPC, the operating system is provided performance information (e.g., an identification of performance capabilities, etc.) for individual processor cores, which is used for setting the operating parameters (and thus performance levels) for the processor cores while keeping processor cores below thermal thresholds.

While CPPC has proven useful for controlling the operation of individual processor cores, individually controlling processor cores can result in less than optimal operation for the processor as a whole and/or for the chiplets therein. For example, using CPPC, an operating system can transfer/rotate tasks between processors in an effort to keep each processor core below a thermal threshold. In a processor with multiple chiplets, this can include transferring tasks between processor cores on the different chiplets. The transfer of tasks between processor cores, and particularly between processor cores on different chiplets, incurs significant overhead, including task transfer delay, communication system bandwidth consumption, etc.—and can cause the transfer of other unrelated tasks. The overhead associated with transferring tasks reduces the overall performance of the processor.

In some processors, the chiplets and the processor cores thereon are tested at manufacture time to find chiplets having homogeneous higher processor core performance. In other words, the chiplets are tested to find chiplets on which all of the processor cores have similar high performance levels, despite substantially unavoidable manufacturing variations in circuitry in the processor cores. The chiplets are then packaged and grouped for sale, or "binned," with other chiplets for which the processor cores all have relatively similar high performance levels. Other chiplets, i.e., chiplets with processor cores having widely varying performance, can be binned in a low performance bin in accordance with their lower performing processor cores—or discarded, which reduces manufacturing yield. Because many chiplets have homogeneous higher processor core performance, transferring tasks among the processor cores using CPPC as described above means that tasks are moved among processors with similar performance levels. The tasks, which can be lower performance tasks, and thus not necessarily need to be run on higher performance processor cores, are therefore run on a processor core with higher performance, which makes operating within operating constraints more difficult.

BRIEF DESCRIPTION OF THE FIGURES

Throughout the figures and the description, like reference numerals refer to the same figure elements.

DETAILED DESCRIPTION

Figure 1:
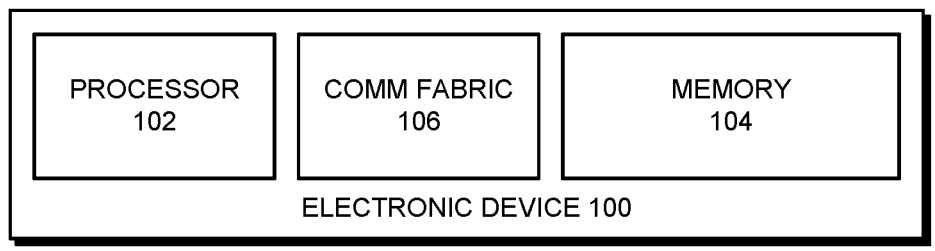
FIG. 1 presents a block diagram illustrating an electronic device in accordance with some embodiments.

The following description is presented to enable any person skilled in the art to make and use the described embodiments and is provided in the context of a particular application and its requirements. Various modifications to the described embodiments will be readily apparent to those skilled in the art, and the general principles described herein may be applied to other embodiments and applications. Thus, the described embodiments are not limited to the embodiments shown, but are to be accorded the widest scope consistent with the principles and features described herein.

Terminology

In the following description, various terms are used for describing embodiments. The following is a simplified and general description of some of the terms. Note that these terms may have significant additional aspects that are not recited herein for clarity and brevity and thus the description is not intended to limit these terms.

Functional block: functional block refers to a set of interrelated circuitry such as integrated circuit circuitry, discrete circuitry, etc. The circuitry is "interrelated" in that circuit elements in the circuitry share at least one property. For example, the circuitry may be included in, fabricated on, or otherwise coupled to a particular integrated circuit chip, substrate, circuit board, or portion thereof, may be involved in the performance of specified operations (e.g., computational operations, control operations, memory operations, etc.), may be controlled by a common control element and/or a common clock, etc. The circuitry in a functional block can have any number of circuit elements, from a single circuit element (e.g., a single integrated circuit logic gate or discrete circuit element) to millions or billions of circuit elements (e.g., an integrated circuit memory). In some embodiments, functional blocks perform operations "in hardware," using circuitry that performs the operations without executing program code.

Data: data is a generic term that indicates information that can be stored in memories and/or used in computational, control, and/or other operatins. Data includes information such as actual data (e.g., results of computational or control operations, outputs of processing circuitry, inputs for computational or control operations, variable values, sensor values, etc.), files, program code instructions, control values, variables, and/or other information.

Memory accesses: memory accesses, or, more simply, accesses, include interactions that can be performed for, on, using, and/or with data stored in memory. For example, accesses can include writes or stores of data to memory, reads of data in memory, invalidations or deletions of data in memory, moves of data in memory, writes or stores to metadata associated with data in memory, etc. In some cases, copies of data are accessed in a cache and accessing the copies of the data can include interactions that can be performed for, on, using, and/or with the copies of the data stored in the cache (such as those described above), along with cache-specific interactions such as updating coherence or access permission information, etc.

Overview

In the described embodiments, an electronic device includes a processor having multiple chiplets, each of the multiple chiplets including two or more processor cores (e.g., central processing unit cores, graphics processing unit cores, etc.). For example, the processor can be a sixteen core processor having four chiplets with four processor cores each. The processor also includes a controller that performs operations for configuring the processor cores on the chiplets. In operation, an operating system (or the other entity) uses chiplet-level performance information provided by the controller, which identifies performance capabilities of specified sets/groups of the processor cores in the chiplets, for selecting processor cores on chiplets on which tasks are to be run. The operating system then causes the controller to configure the selected processor cores on the chiplets at a given performance level in preparation for running the tasks on the selected processor cores. The operating system then runs the tasks on the selected processor cores. In this way, the operating system uses the chiplet-level performance information for distributing tasks among processor cores on the chiplets.

In some embodiments, the controller generates the above-described chiplet-level performance information and provides the chiplet-level performance information to the operating system. For these operations, the controller first acquires, from each chiplet among the multiple chiplets in the processor (e.g., from performance information registers or storage elements on the chiplets) chiplet-level information that identifies a performance of that chiplet for specified sets of processor cores on that chiplet. For example, assuming that a chiplet has four processor cores, the performance information can identify a maximum performance of that chiplet given the use of a single processor core, two processor cores, three processor cores, and four processor cores. The controller then aggregates the chiplet-level performance information for all of the chiplets into a lookup table (or other data structure) that indicates the performance of each chiplet at each of a set of performance levels for each of the specified sets of processor cores on that chiplet. The controller next provides, to the operating system, chiplet-level performance information for each chiplet that identifies the performance of each of the chiplets for the specified sets of processor cores on that chiplet. For example, the controller can store the lookup table in a memory in the electronic device or in a dedicated storage element for the lookup table (e.g., a set of registers, etc.) where the operating system itself can access the lookup table. As another example, the controller can respond to requests from the operating system with information acquired from the lookup table.

In some embodiments, for using the chiplet-level performance information for selecting processor cores in the chiplets upon which tasks (or portions thereof) are to be run, the operating system first, based on performance requirements for the task, selects one or more selected chiplets and numbers of processor cores thereon based on the chiplet-level performance information. For example, the operating system can search the above-described lookup table to determine one or more chiplets with two-processor-core performance that most closely match a high performance threshold, etc. The operating system next communicates, to the controller, an identification of one or more selected chiplets along with the number of processor cores and the performance level at which the number of processor cores is to be configured. The controller, based on the identification, configures processor cores in the one or more selected chiplets at the performance level specified by the operating system. For example, the controller can configure the processor cores by setting operating parameters for the processor cores (e.g., voltages, currents, clock frequencies, etc.) to cause the processor cores to operate at the performance level. The controller can also idle or otherwise handle processor cores that are not to be used for running the task in the one or more selected chiplets and unselected chiplets. The operating system then runs the task (or the portions thereof) on the processor cores in the one or more selected chiplets.

In some embodiments, the above-described performance levels for each of the specified sets of processor cores include higher performance levels, which are generally upper (and possibly maximum) performance levels given thermal and other constraints, and lower performance levels, which are reduced (and possibly minimum) performance levels below which processor cores can operate inefficiently, as well as one or more intermediate performance levels. In these embodiments, therefore, the chiplet-level performance information includes information that identifies the performance of each chiplet at each of these (or other) performance levels for each of the specified sets of processor cores on that chiplet.

In some embodiments, along with configuring processor cores on chiplets, the controller monitors operating performances of the chiplets. In these embodiments, the controller first acquires a delivered performance counter value and a reference performance counter value from or for the given chiplet. The delivered performance counter value identifies the actual performance of the given chiplet during a measurement period (e.g., includes a count of operations performed). The reference performance counter value identifies a reference performance for the given chiplet during a similar measurement period—and may be estimated for an ideal chiplet, measured based on tests of other chiplets, etc. The controller then computes the operating performance for the given chiplet based on the delivered performance and reference performance counter values, i.e., uses a mathematical expression to compute the performance as a function of the delivered performance and reference performance counter values.

By using chiplet-level performance information for distributing tasks among processor cores on chiplets, the described embodiments take into account the performance of sets of two or more processor cores on the chiplets for configuring processor cores for running tasks (as versus existing systems, which use the performance of individual processor cores). This can enable more efficient use of chiplets with heterogeneous processor cores, i.e., processor cores having processor cores with widely varying performances (in contrast to existing systems in which processor cores have homogeneous performance). In other words, tasks can be more effectively matched to processor cores in chiplets having processor cores of varying performance. This in turn enables the use of chiplets having larger performance differences between processor cores, which can help to avoid down-binning (i.e., selling a processor based on the performance of that processor core's lowest performing processor core) or, worse, discarding or partially disabling such chiplets. Using chiplets with larger performance variation can save a chiplet manufacturer money and effort. In addition, by being able to more closely configure processor cores to meet desired performance levels, the described embodiments can improve the performance of the electronic device when running tasks. Improving the overall performance of the electronic device increases user satisfaction with the electronic device.

Electronic Device

FIG. 1 presents a block diagram illustrating electronic device 100 in accordance with some embodiments. As can be seen in FIG. 1, electronic device 100 includes processor 102, memory 104, and communication (COMM) fabric 106. Generally, processor 102, memory 104, and communication fabric 106 are implemented in hardware, i.e., using corresponding integrated circuitry, discrete circuitry, and/or devices. For example, in some embodiments, processor 102, memory 104, and communication fabric 106 are implemented in integrated circuitry on one or more semiconductor chips, are implemented in a combination of integrated circuitry on one or more semiconductor chips in combination with discrete circuitry and/or devices, or are implemented in discrete circuitry and/or devices. In some embodiments, processor 102, memory 104, and/or communication fabric 106 perform operations for or associated with using chiplet-level performance information for distributing tasks among processor cores on chiplets as described herein.

Processor 102 is a functional block that performs operations for running tasks (e.g., executing program code such as software applications, operating systems, performing control or configuration operations, etc.), accessing data in memory 104, and other operations. Processor 102 can be or include a central processing unit (CPU), a graphics processing unit (GPU), an accelerated processing unit (APU), a system on a chip (SOC), a field programmable gate array (FPGA), etc. Processor 102 is described in more detail below.

Memory 104 is a functional block that performs operations for storing data for accesses by processor 102. Memory 104 includes volatile and/or non-volatile memory circuits (e.g., fifth-generation double data rate synchronous DRAM (DDR5 SDRAM)) for storing data, as well as control circuits for handling accesses of the data stored in the memory circuits, performing control or configuration operations, etc.

Communication fabric 106 is a functional block that performs operations for communicating data between other functional blocks in electronic device 100 via one or more communication channels. Communication fabric 108 includes wires/traces, transceivers, control circuits, etc., that are used for communicating the data in accordance with a protocol or standard in use on communication fabric 106. For example, in some embodiments, communication fabric 106 is or includes a communication fabric such as the Infinity Fabric from Advanced Micro Devices Inc. of Santa Clara, Calif.

Although electronic device 100 is shown in FIG. 1 with a particular number and arrangement of elements, in some embodiments, electronic device 100 includes different numbers and/or arrangements of elements. For example, in some embodiments, electronic device 100 includes a different number of processors 102. Electronic device 100 is also simplified for illustrative purposes. In some embodiments, however, electronic device 100 includes additional or different elements. For example, electronic device 100 can include human interface subsystems (e.g., displays, speakers, keyboards, etc.), electrical power subsystems, input-output (I/O) subsystems, etc. Generally, in the described embodiments, electronic device 100 includes sufficient numbers and/or arrangements of elements to perform the operations herein described.

Electronic device 100 can be, or can be included in, any device that performs operations for or associated with using chiplet-level performance information for distributing tasks among processor cores on chiplets as described herein. For example, electronic device 100 can be, or can be included in, a desktop computer, a laptop computer, a wearable computing device, a tablet computer, virtual or augmented reality equipment, a smart phone, an artificial intelligence (AI) or machine learning device, a server, a network appliance, a toy, a piece of audio-visual equipment, a home appliance, a vehicle, etc., and/or combinations thereof. In some embodiments, electronic device 100 is included on one or more semiconductor chips. For example, in some embodiments, electronic device 100 is entirely included in a single "system on a chip" (SOC) semiconductor chip, is included on one or more ASICs, etc.

Processor

Figure 2:
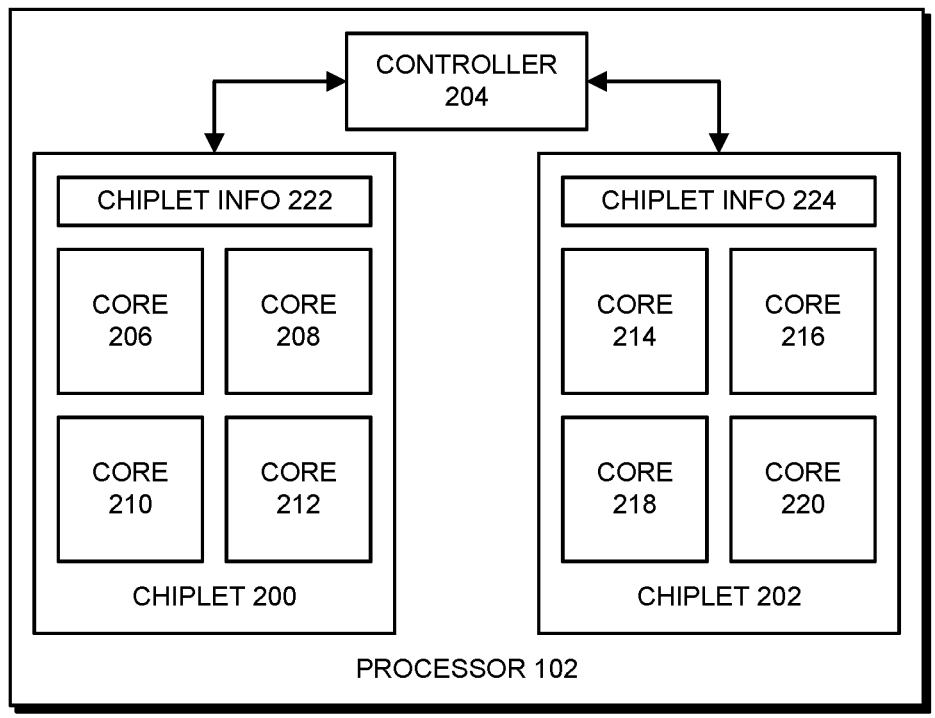
FIG. 2 presents a block diagram illustrating a processor in accordance with some embodiments.

In the described embodiments, a processor performs operations for or associated with using chiplet-level performance information for distributing tasks among processor cores on chiplets. FIG. 2 presents a block diagram illustrating a processor 102 in accordance with some embodiments. As can be seen in FIG. 2, processor 102 includes chiplets 200-202 and controller 204. Generally, processor 102, and thus chiplets 200-202 and controller 204, are implemented in hardware, i.e., using corresponding integrated circuitry, discrete circuitry, and/or devices. For example, in some embodiments, processor 102 is implemented in integrated circuitry (i.e., transistors, signal routes, etc.) on multiple semiconductor chips/dies—with each of chiplets 200-202 implemented in their own semiconductor dies, etc.

Each of chiplets 200-204 is or includes an integrated circuit semiconductor die with integrated circuits fabricated thereon using integrated circuit fabrication processes such as doping or ion implantation, etching, deposition of various materials, photolithographic patterning via one or more masks, etc. Among the integrated circuits on chiplets 200-202 are processor cores (CORE) 206-212 on chiplet 200 and processor cores (CORE) 214-220 on chiplet 202. Each of processor cores 206-220 is a functional block that performs operations for running tasks (e.g., executing program code such as software applications, operating systems, performing control or configuration operations, etc.), accessing data in memory 104, and/or other operations. Each of processor cores 206-220 is or includes a processor core such as a CPU core, a GPU core, an embedded processor, an ASIC, an FPGA, etc. For example, in some embodiments, all of processor cores 206-220 are CPU cores or GPU cores.

In addition to processor cores 206-220, among the integrated circuits on chiplets 200-202 are chiplet-level information (CHIPLET INFO) 222 and 224, respectively. Chiplet-level information 222-224 are functional blocks that include storage element circuitry (e.g., flip-flops/latches, SRAM memory circuitry, etc.) used for storing chiplet-level information that identifies a performance of the respective chiplet at each of a number of different performance levels for each specified set of processor cores on the respective chiplet. For example, in some embodiments, chiplet-level information 222 includes performance information for chiplet 200 at each of three performance levels—a lowest performance, a nominal performance, and a highest performance—for each set of one or more processor cores among processor cores 206-212. In these embodiments, therefore, the chiplet-level information 222 includes an identification of a lowest performance (i.e., a performance level for running tasks below which an efficiency penalty occurs) for one processor core from among 206-212 or a combination of two of processor cores 206-212, three of processor cores 206-212, and all four of processor cores 206-212. In other words, among all of the possible two-processor-core combinations (i.e., processor cores 206-208, 206-210, 206-212, 208-210, 208-212, and 210-212), chiplet-level information 222 includes information about the performance of chiplet 200 for the lowest performing pair of two processor cores, etc. Chiplet-level information 222 also includes similar information for the highest performance and nominal performance performance levels for processor cores 206-212. In some embodiments, chiplet-level information 222 and 224 are initially set when the respective chiplet is manufactured, e.g., based on tests performed by the manufacturer, and remain unchanged. In some embodiments, however, chiplet-level information 222 and 224 is updateable, such as after running the respective chiplet for a given amount of time, based on monitoring chiplet operation, etc.

Figure 3:
FIG. 3 presents a block diagram illustrating a controller in accordance with some embodiments.

Controller 204 is a functional block that performs operations for controlling operating states of processor cores 206-220 on chiplets 200-202. For example, in some embodiments, controller 204 monitors operations of chiplets 200-202 and/or processor cores 206-220, generates and provides chiplet-level performance information for chiplets 200-202 and/or processor cores 206-220 to other entities (e.g., an operating system, etc.), and controls operating states of chiplets 200-202 and/or processor cores 206-220, etc. In some embodiments, controller 204 is or includes a system management unit (SMU), a power controller, a CPU core, a microcontroller, and/or another functional block. FIG. 3 presents a block diagram illustrating controller 204 in accordance with some embodiments. As can be seen in FIG. 3, controller 204 includes processing circuitry 300, chiplet-level performance information 302, and performance requests 304. Processing circuitry 300 is a functional block that performs the operations of controller 204 as described herein, such as monitoring operations of chiplets 200-202 and/or processor cores 206-220, generating chiplet-level performance information 302, etc.

Chiplet-level performance information 302 is a functional block that stores information that identifies the performance of each of chiplets 200-202 for specified sets of processor cores on that chiplet. Chiplet-level performance information 302 includes storage elements (e.g., registers, memory circuitry, etc.) that are used for storing the information that identifies the performance of each chiplet. In some of these embodiments, chiplet-level performance information 302 stores information based on some or all of chiplet-level information 222 and 224 for chiplets 200-202. In these embodiments, processing circuitry 300 acquires (e.g., reads from the storage elements in each chiplet 200-202) chiplet-level information 222-224 and uses chiplet-level information 222-224 for generating chiplet-level performance information 302. For example, processing circuitry 300 can store copies of chiplet-level information 222-224 or values computed or generated therefrom in chiplet-level performance information 302. As described below, in some embodiments, chiplet-level performance information 302 is organized as a lookup table.

Performance requests 304 is a functional block that stores performance request information that is used by processing circuitry 300 for determining how processor cores 206-220 on chiplets 200-202 be configured (e.g., for running tasks, saving electrical power, etc.). Performance requests 304 includes storage elements (e.g., registers, memory circuitry, etc.) that are used for storing performance request information. In operation, an operating system (or another entity) writes information to some or all of the storage elements in performance requests 304 identifying a configuration/performance level at which some or all of processor cores 206-220 are to be configured by processing circuitry 300. For example, in some embodiments, performance requests 304 include information about a number of processor cores for a given chiplet and a specified performance level at which the processor cores are to be configured. Processing circuitry 300 reads information from the storage elements in performance requests 304 and configures some or all of processor cores 206-220 on chiplets 200-202 accordingly. For example, in some embodiments, performance requests 304 includes a highest and/or lowest chiplet performance register for each chiplet. In these embodiments, the operating system (or other entity) writes information about a highest and/or lowest performance into the corresponding chiplet performance register and the information is used by processing circuitry 300 for configuring processor cores in the chiplets. For example, for configuring the processor cores, processing circuitry 300 can set voltages, currents, clock frequencies, queue depths, network interface speeds, etc. for the processor cores.

Although a particular number and arrangement of elements is shown in controller 204 in FIG. 3, in some embodiments, different numbers and/or arrangements of elements are present in controller 204. For example, in some embodiments, one or both of chiplet-level performance information 302 and performance requests 304 are stored in memory 104, from where they are accessed for the above-described operations. Generally, in the described embodiments, controller 204 includes sufficient elements to perform the operations herein described.

Returning to FIG. 2, although processor 102 is shown with a particular arrangement and number of chiplets and processor cores, in some embodiments, processor 102 includes a different number and/or arrangement of chiplets and/or processor cores. For example, in some embodiments, each chiplet includes eight processor cores. Generally, the described embodiments are operable with various numbers and/or arrangements of chiplets and/or processor cores. In addition, although only one controller 204 is shown in the example in FIG. 2, in some embodiments, there are multiple controllers, such as a separate controller for each chiplet. In these embodiments, the multiple controllers are configured to interact with one another for coordinating their operations, such as with a master controller (which may be one of the controllers or a separate controller) coordinating operations of the multiple controllers, etc.

Although embodiments are described in which a controller keeps just chiplet-level performance information 302, in some embodiments, the controller also keeps core-level performance information. In other words, the controller keeps information that identifies the performance of individual cores at various performance levels (e.g., a lowest performance, a nominal performance, a highest performance, etc.). In these embodiments, core-level performance information can be supplied by the chips, etc. in a similar way to chiplet-level performance information as described herein. In some embodiments, the chiplet-level and core-level performance information can be used in combination (e.g., in a hierarchical arrangement) for determining processor cores to be configured at performance levels for performing tasks.

Although embodiments are described in which controller 204 is in processor 102 (e.g., is fabricated on an integrated circuit chip/die along with chiplets 200-202), in some embodiments, controller 204 is located off processor 200. For example, in some embodiments, the controller is located in a chip/die in a chipset (not shown) in electronic device 100. Generally, the chipset includes various integrated circuit chips/dies for managing data flow in the communication fabric 106 and elsewhere between processor 200, memory 104, and peripherals (not shown) and for performing other operations. In some of these embodiments, processor 102, memory 104, and/or the chips/dies of the chipset are mounted to a circuit board, an interposer, and/or another mounting device or element.

Lookup Table

Figures 4, 5:
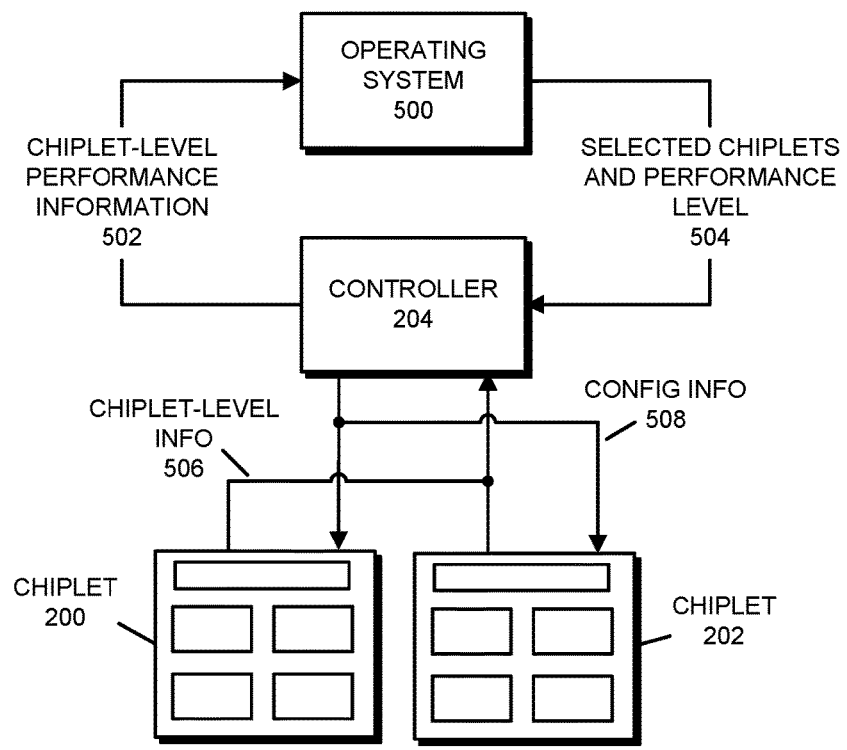
FIG. 4 presents a block diagram illustrating a lookup table with chiplet-level performance information in accordance with some embodiments.
FIG. 5 presents a block diagram illustrating operations for configuring processor cores in chiplets to run tasks at performance levels in accordance with some embodiments.

In some embodiments, chiplet-level performance information (e.g., chiplet-level performance information 302) is organized in the form of a lookup table. FIG. 4 presents a block diagram illustrating lookup table 400 for chiplet-level performance information in accordance with some embodiments. Generally, lookup table 400 includes indicators of (i.e., values that indicate/identify) chiplet performance that enable processing circuitry (e.g., processing circuitry 300) (and possibly other entities) to determine how a given chiplet will perform given different numbers of processor cores and performance levels. In some embodiments, as can be seen along the top row of sub-table 402, the performance levels in lookup table 400 include a lowest performance, which is a performance level for running tasks below which specified circuitry in a processor cores experiences an efficiency penalty (e.g., leakage currents, state fidelity reductions, etc.). The performance levels also include a lowest non-linear performance, which is a lowest performance level for running tasks above which non-linear power savings are achieved, i.e., for levels slightly higher than this performance level, the power efficiency is much better compared to higher values above this threshold. The performance levels additionally include a nominal performance, which is a highest sustainable performance level for running tasks under specified nominal operating conditions. The performance levels further include a highest performance, which is the highest performance level for running tasks under high performance operating conditions (e.g., thermal constraints, throughput requirements, etc.).

For the example in FIG. 4, it is assumed that the lookup table 400 stores chiplet-level performance information for chiplets 200-202 as shown in FIG. 2. As can be seen in FIG. 4, therefore, lookup table 400 includes two sub-tables 402-404, each of sub-tables 402-404 storing information for and about a respective chiplet 200-202. Information about chiplet 200 can therefore be acquired by performing a lookup in lookup table 402. In other words, given a request for chiplet-level performance information for a given number of processor cores and a specified performance level, processing circuitry 300 can perform a lookup in each sub-table 402-404 to acquire the chiplet-level performance information for the respective chiplet 200-202.

In some embodiments, the values of the indicators in lookup table 400 are relative and are set based on respective performance of one or more other processor cores in the respective chiplet. For example, the indicators can be expressed as a function of a performance threshold for a specified processor core on that chiplet. For instance, the specified processor core can be the best performing or worst performing processor core in the chiplet, in view of the performance of all the processor cores on the chiplet (e.g., as tested by a manufacturer, etc.). In some embodiments, therefore, and using sub-table 402 as an example, for a lowest-performance performance level, the lookup table can store a value such as 0.95 for a two-core set of processor cores (i.e., where the performance level is for a combination of two processor cores in the chiplet). In this case, the lowest performance when running a task on two processor cores in the chiplet is two times the lowest performance of the best lowest-performance processor core in the chiplet times 0.95. This can be stated as the expression 2*LowestPerformanceBestCore*0.95. Examples of relative values for four performance levels for combinations of two, three, and four processor cores are shown in sub-table 402 in FIG. 4 (and values of a similar nature would appear in sub-table 404, if it were to be shown).

In some embodiments, the values in lookup table 400 are associated with particular combinations of processor cores for the given chiplet, and thus reflect the performance of the chiplet for running tasks assuming that the particular processor cores are used. Using processor cores 206-212 as an example, the 0.95 value for the lowest performance for two processor cores in sub-table 402 is associated with the two particular processor cores (e.g., processor cores 208 and 212) that most closely (and possibly best) fit the "lowest performance" standard as a pair. In other words, among all of the possible two-processor-core combinations for the given chiplet (i.e., processor cores 206-208, 206-210, 206-212, 208-210, 208-212, and 210-212), the particular combination of two processor cores best met a threshold, guideline, rules, etc. that are associated with the lowest performance performance level (e.g., operating at one or more low frequencies without experiencing an efficiency penalty, such as a specified amount of leakage current, state decay, etc.). In some embodiments, when configuring the one or more selected chiplets to run tasks at a performance level as described elsewhere herein, the controller, the processor, and/or the one or more selected chiplets will use the particular processor cores for which lookup table 400 stores information. For example, when configuring chiplet 200 to operate at a lowest performance level for two processor cores, the two particular processor cores (e.g., processor cores 208 and 212, as described above) will be used—and other processor cores may be disabled or used for running other tasks.

Although sub-tables 402-404 are shown in FIG. 4, in some embodiments, there are no sub-tables—and all the chiplet-level performance information is listed in a single table. In addition, although FIG. 4 uses two four-processor-core chiplets and thus two sub-tables with three rows as an example, in some embodiments, a different number of chiplets and/or processor cores can be used and a corresponding number of sub-tables and/or rows will be present in lookup table 400. Generally, in the described embodiments, lookup table 400 includes sufficient information to enable processing circuitry 300 (and possibly other entities) to look up chiplet-level performance information based on numbers of processor cores and performance levels.

Configuring Chiplets

In the described embodiments, a controller in a processor configures processor cores in selected chiplets in the processor at specified performance levels as requested by an operating system (or another entity). FIG. 5 presents a block diagram illustrating operations for configuring processor cores in chiplets to run tasks at performance levels in accordance with some embodiments. FIG. 5 is presented as a general example of operations performed in some embodiments. In other embodiments, however, different operations are performed and/or operations are performed in a different order. Additionally, although certain elements are used in describing the process (e.g., a controller, etc.), in some embodiments, other elements perform the operations.

For the example in FIG. 5, an embodiment with two chiplets, i.e., chiplets 200-202, is described. Some elements in chiplets 200-202, however, are left unlabeled in FIG. 5 itself for clarity (i.e., processor cores 206-220 and chiplet-level information 222-224). In addition, for the example in FIG. 5, it is assumed that controller 204 previously generated chiplet-level performance information 302 in the form of lookup table 400. In other words, controller 204 acquired chiplet-level information 222 and 224 (shown as chiplet-level info 506 in FIG. 5) from chiplets 200 and 202 and generated lookup table 400 therefrom. For the example in FIG. 5, it is also assumed that controller 204 performs lookups in a lookup table (e.g., lookup table 400) and returns performance indicators to requesting entities (i.e., instead of providing the lookup table 400 itself to other entities). It is further assumed that operating system 500, e.g., the Windows® operating system from Microsoft of Redmond, Wash., is being executed by the processor.

The operations in FIG. 5 begin when controller 204 provides chiplet-level performance information 502 to operating system 500. For this operation, in some embodiments, operating system 500 requests, from controller 204, chiplet-level performance information for a given number of processor cores (e.g., two, three, etc.) and a specified performance level (e.g., lowest performance, nominal performance, etc.). For example, in some embodiments, the operating system uses an application programming interface (API) provided by/supported by the controller to interact with the controller for making the request—and receiving the corresponding response. Upon receiving the request from operating system 500, controller 204 acquires the appropriate chiplet-level performance information and returns the chiplet-level performance information 502 to operating system 500. Continuing the lookup table 400 example, operating system 500 uses the given number of processor cores and the specified performance level to perform a lookup in lookup table 400 for each processor core (e.g., in sub-tables 402-404) and then returns chiplet-level performance information 502 from lookup table 400 to operating system 500. For example, controller 204 can acquire indicators such as the 0.95 for the lowest performance for two processor cores from sub-table 402 and return the indicators to operating system 500.

Operating system 500 then sends a request to controller 204 that identifies the number of processor cores on selected chiplets and the performance level 504 at which operating system 500 wants controller 204 to configure the chiplets. For this operation, operating system 500 analyzes chiplet-level performance information 502 to determine chiplets that are satisfactory for running a task. For example, operating system 500 can determine, based on chiplet-level performance information 502, one or more chiplets with a performance that best matches (i.e., is most closely like) a performance level threshold and can select the best-matching one or more chiplets for running the task. For instance, for the highest performance performance level, operating system 500 can determine the chiplet for which a two-processor-core combination has an indicator that most closely approaches 1 (e.g., such as the 0.92 in sub-table 402). Operating system 500 then sends the request including the number of processor cores on the selected chiplets and the performance level 504 to controller 204 to cause controller 204 to configure the chiplets. In some embodiments, for this operation, operating system 500 writes corresponding information to performance requests 304 in order to inform controller 204 of the request.

Controller 204 then communicates configuration information (INFO) 508 to one or both of chiplets 200-202 to configure the requested number of processor cores on the selected chiplets at the performance level. For example, in some embodiments, controller 204 sets voltages, currents, clock frequencies, queue depths, network interface speeds, etc. for the number of processor cores in the selected chiplets based on information in performance requests 304. In other words, controller 204 adjusts adjustable circuitry via switches or other configuration elements, requests adjustments from controlling circuit elements, etc. so that voltages, currents, clock frequencies, etc. provided to the number of processor cores in the selected chiplets are set in accordance with a requested performance level. In some embodiments, other processor cores in the selected chiplets are disabled, set to a low-power operating state, and/or are otherwise handled. In some embodiments, performance levels for the other processor cores on the selected chiplets (and possibly unselected chiplets) are set based at least in part on the configuration of the selected chiplets and/or processor cores therein (e.g., to keep a given chiplet within a thermal limit, etc.).

Process for Configuring Chiplets

Figure 6:
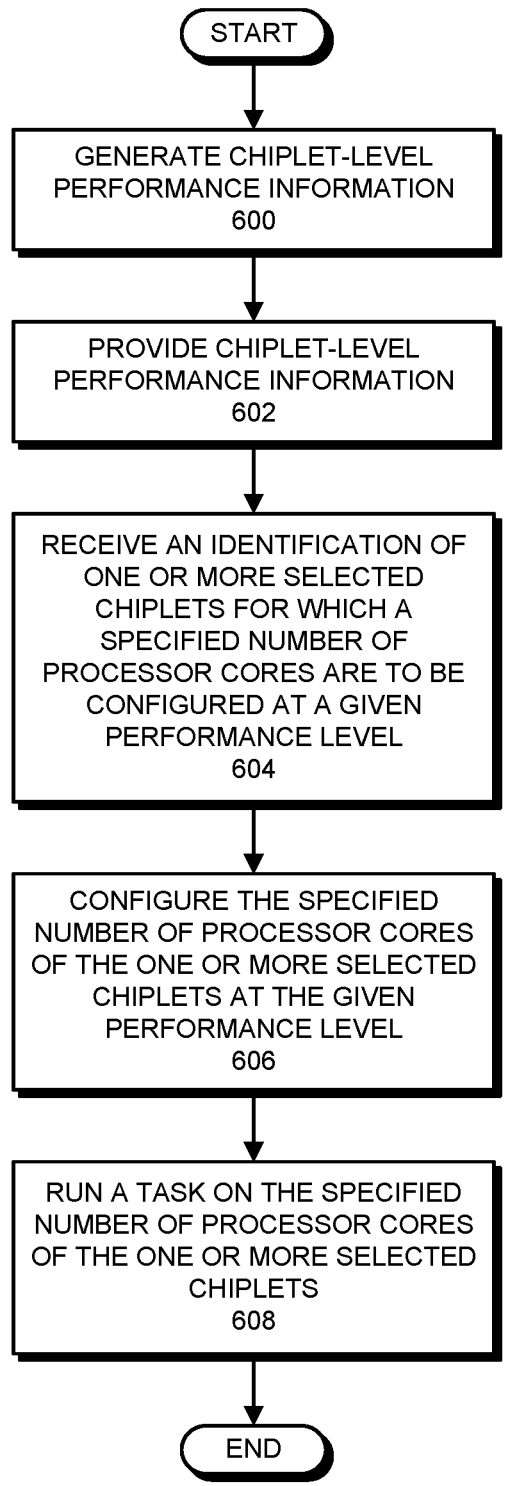
FIG. 6 presents a flowchart illustrating a process for configuring processor cores on chiplets in accordance with some embodiments.

In the described embodiments, a controller (e.g., controller 204) performs operations for configuring processor cores on chiplets (e.g., processor cores 206-220 on chiplets 200-202) at specified performance levels. FIG. 6 presents a flowchart illustrating a process for configuring processor cores on chiplets in accordance with some embodiments. FIG. 6 is presented as a general example of operations performed in some embodiments. In other embodiments, however, different operations are performed and/or operations are performed in a different order. For example, in some embodiments, the chiplet-level performance information (step 600) is prepared by the controller well prior to the other operations in FIG. 6—and steps 602-608 may be performed multiple (and possibly many) times with the same chiplet-level performance information. Additionally, although certain elements are used in describing the process (e.g., a controller, etc.), in some embodiments, other elements perform the operations.

A processor similar to processor 102 is used in describing the example in FIG. 6. The processor is therefore assumed to have two chiplets, e.g., chiplets 200-202, with eight processor cores between them, e.g., processor cores 206-220, as well as a controller, controller 204. In addition, a lookup table, e.g., lookup table 400, is used as the chiplet-level performance information for the example in FIG. 6.

The process shown in FIG. 6 starts when the controller in a processor generates chiplet-level performance information (step 600). For this operation, the controller acquires chiplet-level information from storage elements on each chiplet in the processor (e.g., chiplet-level information 222 and 224) and writes the chiplet-level information into corresponding locations in a lookup table. For example, in some embodiments, the controller writes relative numerical indicators to locations in the lookup table (as described above for FIG. 4).

The controller then provides the chiplet-level performance information (step 602). For this operation, in some embodiments, the controller provides the chiplet-level performance information by making the entire lookup table available to an operating system (and possibly other entities). For example, the controller can store the lookup table in shared/public memory circuitry (e.g., in memory 104, in dedicated registers, etc.), from where the operating system can access the lookup table. In these embodiments, the operating system acquires information from the lookup table by performing its own lookups in the lookup table for particular numbers of processor cores and performance levels. During such lookups, the operating system will retrieve indicators from the lookup table (e.g., 0.95 for two processor cores and lowest performance in lookup table 400, etc.). In some embodiments, however, the controller provides the chiplet-level performance information by responding to requests from the operating system (and possibly other entities), but stores the lookup table locally (e.g., in local storage elements in the controller, etc.). In these embodiments, the controller retrieves and provides only requested indicators from the lookup table in response to requests. In these embodiments, therefore, the operating system requests, from the controller, indicators associated with a particular number of processor cores and a performance level. Upon receiving such a request, the controller retrieves the respective indicators from the lookup table and provides the indicators to the operating system in a response.

The controller next receives an identification of one or more selected chiplets for which a specified number of processor cores are to be configured at a given performance level (step 604). For this operation, the operating system uses the provided chiplet-level performance information to determine chiplets for which the specified number of processor cores are to be configured at the given performance level in order to prepare the specified number of processor cores for running a task. For example, the operating system can compare indicators from the lookup table with one or more thresholds and/or with each other to determine one or more chiplets that match (or most closely match, exceed, etc.) the performance level for the specified number of processor cores. Upon selecting one or more selected chiplets for which the performance level is satisfactory, the operating system communicates a request to the controller to configure the specified number of processor cores in the one or more chiplets at the given performance level. For example, the operating system can write information that identifies the one or more selected chiplets and the specified number of processor cores to a chiplet performance register associated with the given performance level in the controller. In these embodiments, the controller receives the identification by reading the chiplet performance register associated with the given performance level (e.g., in response to an interrupt from the operating system, to detecting the write, etc.).

The controller then configures the specified number of processor cores of the one or more chiplets at the given performance level (step 606). For this operation, the controller sets, for each of the specified number of processor cores, one or more operating parameters based on the given performance level. For example, the controller may set operating parameters such as voltages, currents, clock frequencies, queue depths, network interface speeds, etc. Recall that the indicators in the lookup table are associated with particular processor cores. In this operation, therefore, the controller configures the particular processor cores associated with the indicator. For example, when a request is received to set two out of the four processor cores in the processor to the lowest performance level, the controller, which knows the two processor cores to which the indicator in the lookup table applies, configures these two processor cores at the lowest performance level. Other processor cores that are not configured as described may be disabled, placed in a low-power mode (e.g., with operating parameters set to low power levels, etc.), and/or used for other purposes (e.g., for running other tasks).

The operating system then runs a task on the specified number of processor cores of the one or more selected chiplets (step 608). For this operation, the operating system runs a task such as executing program code, performing control or configuration operations, etc. on the specified number of processor cores of the one or more selected chiplets. In these embodiments, therefore, the operating system first configures the specified number of processor cores of the one or more selected chiplets (with the assistance of the controller) and then runs a task on the specified number of processor cores of the one or more selected chiplets.

Process for Determining the Performance of Chiplets

Figure 7:
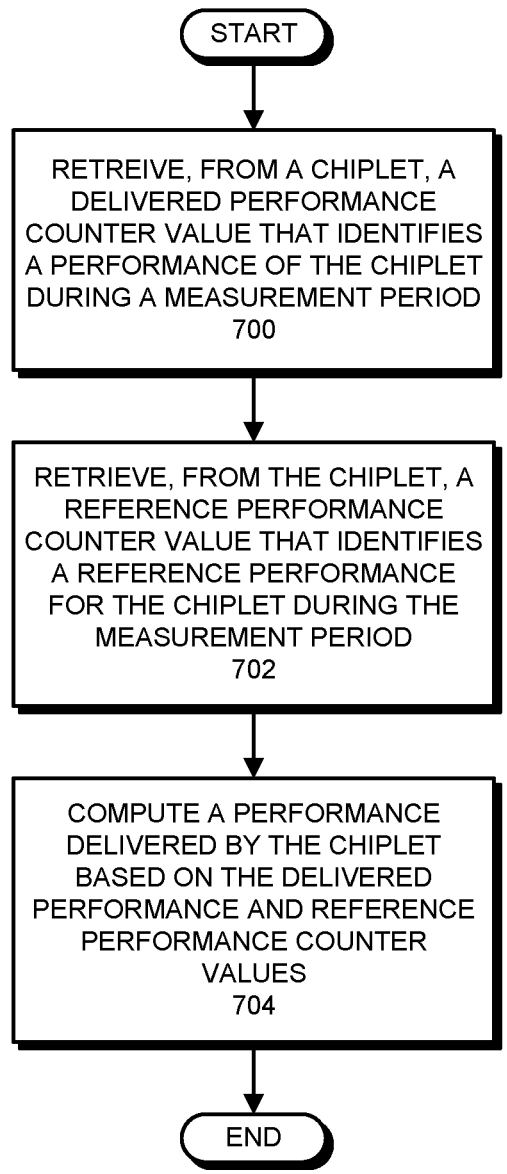
FIG. 7 presents a flowchart illustrating a process for determining the performance of a chiplet in accordance with some embodiments.

In some embodiments, in addition to the other operations described herein, the controller performs operations for determining the performance of chiplets in a processor. In these embodiments, the controller uses actual/measured performance information as well as reference information for determining the performance of the chiplets. FIG. 7 presents a flowchart illustrating a process for determining the performance of a chiplet in accordance with some embodiments. FIG. 7 is presented as a general example of operations performed in some embodiments. In other embodiments, however, different operations are performed and/or operations are performed in a different order. Additionally, although certain elements are used in describing the process (e.g., a controller, etc.), in some embodiments, other elements perform the operations.

The process in FIG. 7 starts when the controller retrieves, from a chiplet in a processor (e.g., chiplet 200), a delivered performance counter value that identifies a performance of the chiplet during a measurement period (step 700). For this operation, the controller retrieves the delivered performance counter value from a storage element in the chiplet (or possibly elsewhere) such as a delivered performance counter value register. The delivered performance counter value is a value that represents, or is set in proportion to, one or more indicators of the performance of the chiplet during the measurement period (e.g., for N ms, where N=250, 500, or another number). For example, in some embodiments, the delivered performance counter value is or includes a count of operations performed, a count of instructions executed, etc. while running a task.

The controller also retrieves, from the chiplet in a processor (or elsewhere), a reference performance counter value that identifies a reference performance of the chiplet during a measurement period (step 702). For this operation, the controller retrieves the reference performance counter value from a storage element in the chiplet such as a reference performance counter value register. The reference performance counter value is a value that represents, or is set in proportion to, one or more indicators of an expected or reference performance of the chiplet during the measurement period. For example, in some embodiments, the reference performance counter value is or includes an expected or reference count of operations performed, a count of instructions executed, etc. while running a task.

The controller then computes a performance delivered by the chiplet during the reference period based on the delivered performance and reference performance counter values (step 704). For this operation, the controller computes a result of a mathematical expression as a function of the delivered performance counter value and reference performance counter value, the result representing, or in proportion to, a delivered performance of the chiplet. For example, in some embodiments, the controller computes a result for the following expression:

$$\text{delivered performance} = \text{reference performance} * \sum_{k=0}^{n} \frac{\Delta_k \text{ delivered performance}}{\Delta_k \text{ reference performance}}$$

In some embodiments, at least one electronic device (e.g., electronic device 100, etc.) or some portion thereof uses code and/or data stored on a non-transitory computer-readable storage medium to perform some or all of the operations described herein. More specifically, the at least one electronic device reads code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile and/or non-volatile memory, including flash memory, random access memory (e.g., DDR5 DRAM, SRAM, eDRAM, etc.), non-volatile RAM (e.g., phase change memory, ferroelectric random access memory, spin-transfer torque random access memory, magnetoresistive random access memory, etc.), read-only memory (ROM), and/or magnetic or optical storage mediums (e.g., disk drives, magnetic tape, CDs, DVDs, etc.).

In some embodiments, one or more hardware modules perform the operations described herein. For example, the hardware modules can include, but are not limited to, one or more central processing units (CPUs)/CPU cores, graphics processing units (GPUs)/GPU cores, application-specific integrated circuit (ASIC) chips, field-programmable gate arrays (FPGAs), compressors or encoders, encryption functional blocks, compute units, embedded processors, accelerated processing units (APUs), controllers, requesters, completers, network communication links, and/or other functional blocks. When circuitry (e.g., integrated circuit elements, discrete circuit elements, etc.) in such hardware modules is activated, the circuitry performs some or all of the operations. In some embodiments, the hardware modules include general purpose circuitry such as execution pipelines, compute or processing units, etc. that, upon executing instructions (e.g., program code, firmware, etc.), performs the operations. In some embodiments, the hardware modules include purpose-specific or dedicated circuitry that performs the operations "in hardware" and without executing instructions.

In some embodiments, a data structure representative of some or all of the functional blocks and circuit elements described herein (e.g., electronic device 100 or some portion thereof) is stored on a non-transitory computer-readable storage medium that includes a database or other data structure which can be read by an electronic device and used, directly or indirectly, to fabricate hardware including the functional blocks and circuit elements. For example, the data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of transistors/circuit elements from a synthesis library that represent the functionality of the hardware including the above-described functional blocks and circuit elements. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described functional blocks and circuit elements. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N, T, and X As used herein, despite possibly using similar letters in different locations in this description, the variables and unspecified values in each case are not necessarily the same, i.e., there may be different variable amounts and values intended for some or all of the general variables and unspecified values. In other words, particular instances of N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the electronic device performs a first operation, a second operation, etc.," the electronic device performs at least one of the first operation, the second operation, and other operations. In addition, the elements in a list associated with an etc. are merely examples from among a set of examples—and at least some of the examples may not appear in some embodiments.

The foregoing descriptions of embodiments have been presented only for purposes of illustration and description.

They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A processor, comprising:
a plurality of chiplets, each chiplet including a plurality of processor cores; and
a controller, the controller being configured to:
provide chiplet-level performance information for the chiplets that identifies a performance of each chiplet at each of a plurality of performance levels for specified sets of processor cores on that chiplet;
receive an identification of one or more selected chiplets from among the plurality of chiplets for which a specified number of processor cores are to be configured at a given performance level, the one or more selected chiplets having been selected based on the chiplet-level performance information and performance requirements; and
configure the specified number of processor cores of the one or more selected chiplets at the given performance level.

2. The processor of claim 1, wherein, for providing the chiplet-level performance information, the controller is configured to:
provide a lookup table that indicates the performance of each chiplet at each of the plurality of performance levels for the specified sets of processor cores on that chiplet, wherein each of the specified sets of processor cores includes a different number of processor cores.

3. The processor of claim 2, wherein an indicator of the performance of each chiplet at each of the plurality of performance levels for each of the specified sets of processor cores is expressed as a value computed as a function of performance capacities for one or more cores in that chiplet.

4. The processor of claim 2, wherein the controller is further configured to:
generate the lookup table by, for each chiplet:
acquiring, from a storage element on that chiplet, chiplet-level information that identifies the performance of that chiplet at each of the plurality of performance levels for each of the specified sets of processor cores on that chiplet; and
writing, to the lookup table, based on the chiplet-level information, an indicator of the performance of that chiplet at each of the plurality of performance levels for each of the specified sets of processor cores on that chiplet.

5. The processor of claim 2, wherein the plurality of performance levels include some or all of: a lowest performance, a lowest non-linear performance, a nominal performance, and a highest performance.

6. The processor of claim 1, further comprising:
a chiplet performance register in the controller associated with each performance level;
wherein, when receiving the identification of the one or more selected chiplets, the controller is configured to:
receive information written to a chiplet performance register associated with the given performance level, the information identifying the one or more selected chiplets and the specified number of processor cores.

7. The processor of claim 1, wherein, when configuring the specified number of processor cores of the one or more selected chiplets at the given performance level, the controller is configured to:
set, for each of the specified number of processor cores, one or more operating parameters based on the given performance level.

8. The processor of claim 1, wherein the controller is further configured to:
measure a performance delivered by chiplets among the plurality of chiplets by, for each chiplet:
acquiring a delivered performance counter value from that chiplet, the delivered performance counter value identifying a performance of that chiplet during a measurement period;
acquiring a reference performance counter value from that chiplet, the reference performance counter value identifying a reference performance for that chiplet during the measurement period; and
computing the performance delivered by the chiplet based on the delivered performance counter value and the reference performance counter value.

9. The processor of claim 1, wherein some or all of the processor cores in each chiplet have different performance levels due to manufacturing variations in circuitry in the processor cores.

10. The processor of claim 1, wherein, after the specified number of processor cores of the one or more selected chiplets is configured at the given performance level, a task is run on the specified number of processor cores of the one or more selected chiplets.

11. The processor of claim 1, wherein, when configuring specified number of processor cores of the one or more selected chiplets at the given performance level, the controller configures other processor cores of the selected chiplets in a low-power state or disables the other processor cores.

12. A method for configuring processor cores in chiplets for a processor that includes a plurality of chiplets, each chiplet including a plurality of processor cores, the method comprising:
providing chiplet-level performance information for the chiplets that identifies a performance of each chiplet at each of a plurality of performance levels for specified sets of processor cores on that chiplet;
receiving an identification of one or more selected chiplets from among the plurality of chiplets for which a specified number of processor cores are to be configured at a given performance level, the one or more selected chiplets having been selected based on the chiplet-level performance information and performance requirements; and
configuring the specified number of processor cores of the one or more selected chiplets at the given performance level.

13. The method of claim 12, wherein providing the chiplet-level performance information includes:
providing a lookup table that indicates the performance of each chiplet at each of the plurality of performance levels for the specified sets of processor cores on that chiplet, wherein each of the specified sets of processor cores includes a different number of processor cores.

14. The method of claim 13, wherein an indicator of the performance of each chiplet at each of the plurality of performance levels for each of the specified sets of processor cores is expressed as a value computed as a function of performance capacities for one or more cores in that chiplet.

15. The method of claim 13, wherein the method further comprises:
generating the lookup table by, for each chiplet:
acquiring, from a storage element on that chiplet, chiplet-level information that identifies the performance of that chiplet at each of the plurality of performance levels for each of the specified sets of processor cores on that chiplet; and
writing, to the lookup table, based on the chiplet-level information, an indicator of the performance of that chiplet at each of the plurality of performance levels for each of the specified sets of processor cores on that chiplet.

16. The method of claim 13, wherein the plurality of performance levels include some or all of: a lowest performance, a lowest non-linear performance, a nominal performance, and a highest performance.

17. The method of claim 12, wherein receiving the identification of the one or more selected chiplets includes:
receiving information written to a chiplet performance register associated with the given performance level, the information identifying the one or more selected chiplets and the specified number of processor cores.

18. The method of claim 12, wherein configuring the specified number of processor cores of the one or more selected chiplets at the given performance level includes:
setting, for each of the specified number of processor cores, one or more operating parameters based on the given performance level.

19. The method of claim 12, wherein the method further comprises:
measuring a performance delivered by a chiplet among the plurality of chiplets by:
acquiring a delivered performance counter value from the chiplet, the delivered performance counter value identifying a performance of the chiplet during a measurement period;
acquiring a reference performance counter value from the chiplet, the reference performance counter value identifying a reference performance for the chiplet during the measurement period; and
computing the performance delivered by the chiplet based on the delivered performance counter value and the reference performance counter value.

20. The method of claim 12, wherein some or all of the processor cores in each chiplet have different performance levels due to manufacturing variations in circuitry in the processor cores.

21. The method of claim 12, wherein the method further comprises:
after the specified number of processor cores of the one or more selected chiplets is configured at the given performance level, running a task on the specified number of processor cores of the one or more selected chiplets.

22. The method of claim 12, wherein configuring specified number of processor cores of the one or more selected chiplets at the given performance level includes:
configuring other processor cores of the selected chiplets in a low-power state or disabling the other processor cores.

23. An electronic device, comprising:
a memory;
a processor, the processor including a plurality of chiplets, each chiplet including a plurality of processor cores; and
a controller, the controller being configured to:
provide chiplet-level performance information for the chiplets that identifies a performance of each chiplet at each of a plurality of performance levels for specified sets of processor cores on that chiplet;
receive an identification of one or more selected chiplets from among the plurality of chiplets for which a specified number of processor cores are to be configured at a given performance level, the one or more selected chiplets having been selected based on the chiplet-level performance information and performance requirements; and
configure the specified number of processor cores of the one or more selected chiplets at the given performance level.

24. The electronic device of claim 23, wherein the controller is located off the processor in a chipset.

* * * * *